United States Patent Office 3,539,428
Patented Nov. 10, 1970

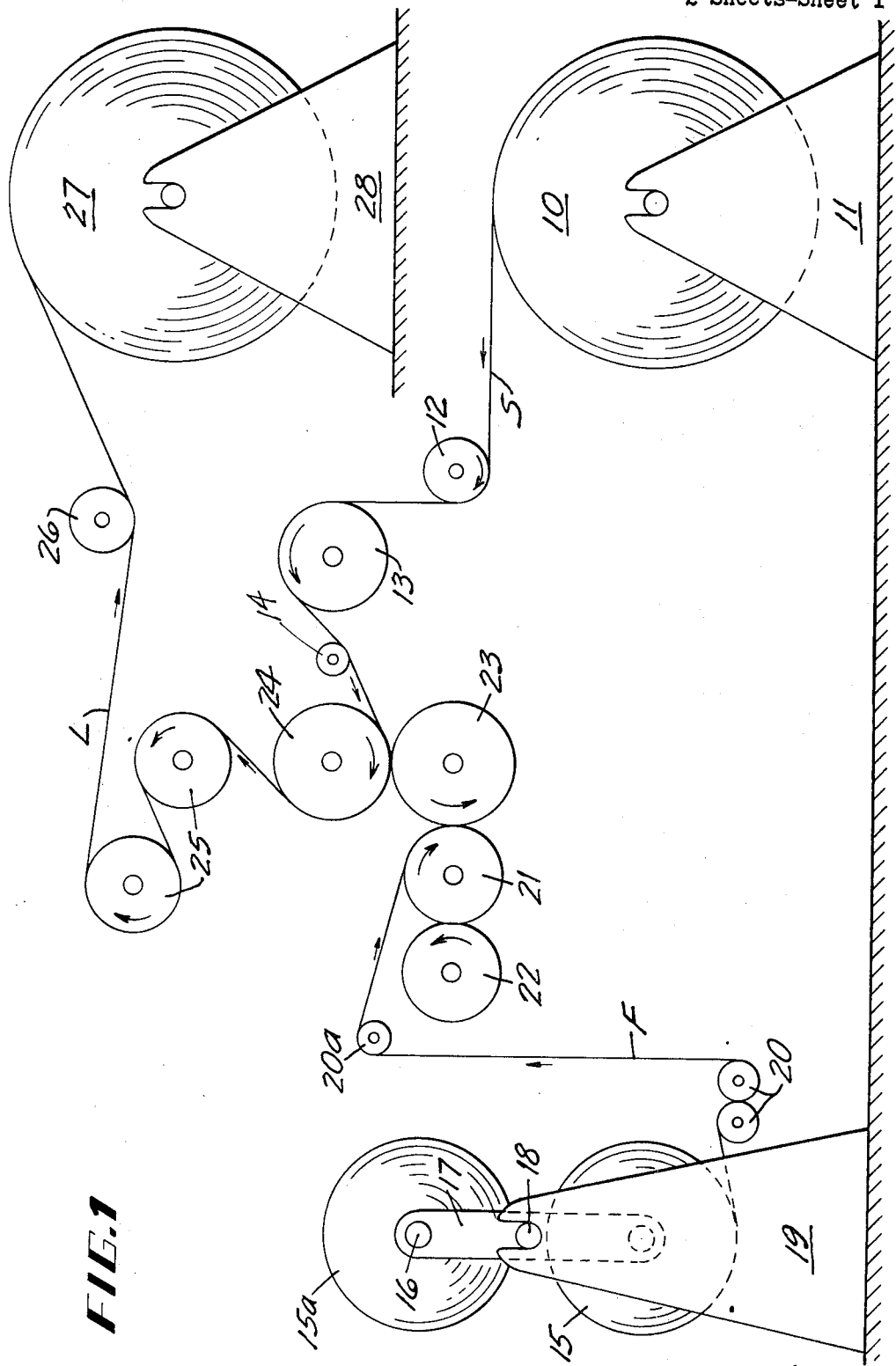

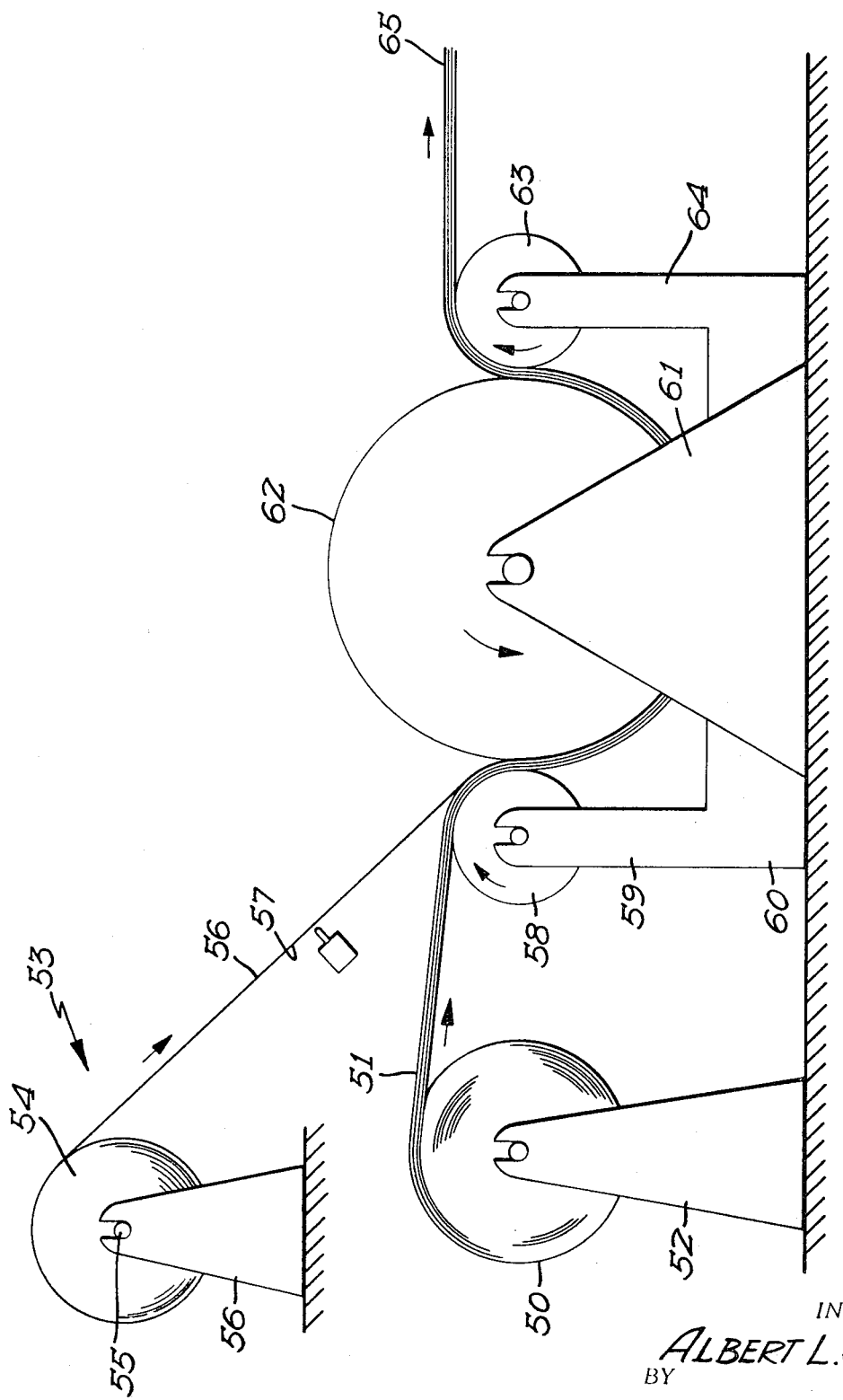

3,539,428
HEATED FILM TRANSFER PROCESS AND ARTICLE PRODUCED THEREBY
Albert L. James, Hickory Corners, Mich. 49060
Continuation-in-part of abandoned application Ser. No. 521,674, Jan. 19, 1966. This application Nov. 22, 1968, Ser. No. 790,495
Int. Cl. B32b 31/28
U.S. Cl. 156—272
6 Claims

ABSTRACT OF THE DISCLOSURE

A laminating process in which a thermoplastic film is heat sealed to a substrate sheet by quickly heating the film just prior to laminating the film to the substrate. The film has one surface thereof treated to render the surface polar and this surface becomes an interface of the laminate. The film is passed over a heating roll, the latter having release properties to prevent sticking of the film thereto whereby the film is heated and is bonded to the substrate. The substrate is positioned exteriorly of the film as the substrate is moved over the heating roll.

---

This is a continuation-in-part application of my copending application, Ser. No. 521,674, filed Jan. 19, 1966, now abandoned.

SUMMARY OF THE INVENTION

An object of this invention is to provide a process for forming a heat sealing lamination from a film of thermoplastic material and a substrate sheet wherein the film is maintained in an unheated condition until just prior to the laminating operation, at which time the film is heated to a temperature sufficient to permit bonding with the substrate upon the application of pressure. This thermoplastic film is supported by the heating medium, the latter having a heating surface with release properties therein with respect to the film so that the film only slightly adheres to the heating medium. When polyolefin film is used, one surface of the polyolefin will be treated to render the same polar while the other surface will remain non-polar, and it is the non-polar surface which contacts the heating surface of the heating medium while the polar surface becomes an interface of the laminate. The process can be continuously carried out and both the thermoplastic film and substrate sheet may be selected from a number of available materials, although it is preferred that a polyolefin be used for the film.

BRIEF DESCRIPTION OF THE FIGURES OF THE DRAWING

FIG. 1 is a diagrammatic illustration of one embodiment of an apparatus system which may be used to carry out the present process, and FIG. 2 is a diagrammatic illustration of another embodiment of an apparatus system for carrying out the novel process.

DETAILED DESCRIPTION OF THE INVENTION

In my copending application, Ser. No. 378,491, filed June 29, 1964, now U.S. Pat. No. 3,360,412, the process disclosed therein involves the production of a heat sealed lamination formed from a thermoplastic film and a substrate, and in which the heat for the heat sealing film is provided by the substrate. The film is maintained in the cooled condition until it is urged into intimate contact with the heated substrate with the application of pressure which produces the heat sealed laminate. The film may be selected from any of the commercially available thermoplastic materials although polyolefin film is preferred and specifically polyethylene. However, other thermoplastic films may be used, such as vinyl acetate, polyvinylidene chloride, cellulose acetate, vinyl chloride, vinyl chloride-acetate copolymer, ethyl cellulose, cellulose triacetate, rubber hydrochloride "Pliofilm," polystyrene, polyvinyl alcohol, polyvinyl butyral and polyvinyl acetate. The film must be capable of being heat sealed to the substrate so that one surface of the film must be polar. In the event that the film is a polyolefin such as polyethylene, it will be necessary to treat one surface of the polyethylene film to render the same polar by the gas flame oxidation process or the corona discharge process such as that disclosed in my U.S. Pat. No. 3,360,417. Both of these methods are well known in the art for activating a surface of polyolefin film.

The substrate may also be formed of any of the materials used in the packaging field such as kraft paper, paperboard, cellophane, glassine paper, saran coated one side cellophane, sulphite paper, ground wood sheet, various foils and metal sheets and the like. The substrate sheet will necessarily have different physical or chemical properties than the thermoplastic film, although thermoplastic film or sheets may also be used as a substrate.

It is preferred that the substrate be preheated prior to bringing the substrate and thermoplastic film into intimate contacting relation by preheating the substrate, even to a temperature substantially lower than the fusion temperature of the polyolefin film will tend to accelerate the chemical and mechanical bonding at the interfacial surfaces of the substrate and film. The substrate sheet must not be heated to a temperature that would cause undesirable physical and chemical changes in the substrate. To this end, various kinds of paper become dehydrated upon intense seating rendering the material weak, brittle, nonformable, and nonscorable. Other substrate papers and paperboards undergo color changes when subjected to extremes in temperatures. Similarly, printed substrates formed of paper can experience ink color change when subjected to a relatively high temperature for an extended period of time. It has been found that for most substrates and especially paper and paperboard type substrates, the preheating of from about 150 degrees to 210 degrees F. produces very beneficial results.

The thermoplastic film will be maintained in a cool condition until applied to the heating medium. The heating medium comprises a revolvable heating drum which also constitutes part of the pressure applying medium since the heated drum also serves as one of the nip rolls. In the event that a polyolefin film is used, the untreated or non-polar surface of the film will contact the heating drum while the treated surface of the film will be disposed outwardly and to ultimately become an interface of the laminate. The heating drum will also be provided with a heating surface having released properties with respect to the hot untreated or non-polar surface of the polyethylene film when the latter is used. Therefore, when the film is heated to its fusion temperature as, for example, 280 degrees F. for a low density polyethylene film, the untreated surface of the film will lightly adhere to the heating surface of the heating drum. Thereafter, when the film is brought into intimate contacting relation with the substrate, and pressure is applied thereto, chemical and mechanical bonding will occur between the treated surface of the film and substrate so that a heat seal laminate is formed. The adhesion between the interfacial surfaces of the laminate is substantially greater than the light cohesion between the untreated surface of the film and the heating surface of the drum so that as the laminate is formed at the laminating nip, the film will be stripped from the heating drum. The laminate is thereafter cooled and wound upon a roll and is especially adaptable for use in forming packaging materials.

Referring now to the drawing, it will be seen that one embodiment of the apparatus system for practicing the steps of the present laminating process is thereshown. The substrate S is unwound from a roll 10 of substrate which is suitably mounted upon an unwind stand 11. In order to assure that the substrate will be fed to the laminating nip under uniform tension conditions regardless of the diameter of the unwind roll 10, it is preferred that an adjustable constant tension device be provided although no such device has been shown in the drawing. Similarly, an edge guide device may be provided to assure delivery of the substrate sheet to the laminating nip in alignment with the thermoplastic film regardless of the size of the substrate roll or the printing weave thereof.

The substrate S is then trained over an idler type spreader roll 12 which may be of herringbone construction to flatten out the sheet although the particular construction of the spreader roll 12 will be dependent upon the particular kind of substrate being handled.

The substrate is then trained over a preheating roll 13 which is of cylindrical construction and which may be steam heated or heated by other circulating heat transfer fluid to a temperature adequate to heat the substrate to approximately 150 degrees to 210 degrees F. Preheating of the substrate sheets tends to accelerate the bonding thereof with the thermoplastic film, although it is not necessary to heat the substrate. The substrate S is thereafter trained over an idler spreader roll 14 before it is fed into the laminating nip for the laminating step. This idler type sreader roll 14 may also be of herringbone construction in the manner of the spreader roll 12 although other types of spreader rolls may also be used.

The thermoplastic film F is unwound from a roll 15 which is revolvably mounted upon one of a pair of shafts 16 carried by a swingable arm 17. The arm 17 is pivotally mounted upon a turret type unwind stand 19 by pivot 18. A second roll 15a of thermoplastic material is also mounted upon the other shaft 16 of the turret unwind stand 19 so that a reserve roll will be available when the roll of thermoplastic material being processed is completely unwound. This turret unwind stand 19 is of the type which permits a flying splice to be made with respect to the rolls of film being used thereby permitting a continuous operation of the laminating process. The apparatus system associated with the infeed of the thermoplastic film to the laminating nips should be provided with a delicate constant unwind tension brake or device to avoid subjecting the film to excessive tension conditions and to thereby avoid stretching, wrinkling and shrinkage in the width dimension. It is also desirable to provide the infeed system of the apparatus with a suitable film web alignment means such as the edge guide equipment associated with the infeed of the substrate to the laminating nip thereby permitting the film and substrate to be in perfect alignment when they are fed to the laminating nip.

The thermoplastic film is passed between a pair of splicing nip rolls 20 which not only effect a firm splice between the respective ends of two rolls of thermoplastic film, but also serves as a very effective adjustable constant film tensioning device when at least one of the nip rolls is driven from the laminating roll means.

In the present embodiment, it is preferred that at least one of the nip rolls 20 be provided with drive connections to the laminating roll means so that nip rolls will serve as a tension device.

The film F is then trained over an idler type spreader roll 20a which may be of herringbone construction although other types of spreader rolls such as a driven Mt. Hope or a driven expanding slat roll may also be used. The film F is then trained over a silicone rubber covered roll 21 which is of metal construction but which is provided with a cover of 3/8 to 1/4 inch silicone rubber.

A back up roll 22 which is of spiral shell construction is disposed in contacting relation with the roll 21 and serves to cool the roll 21. To this end it is pointed out that a cooling fluid such as water or the like is rapidly circulated through the cooling roll 22 so that this roll 22 serves to continuously remove heat from the roll 21. This heat exchange action between rolls 21 and 22 is sufficient to keep the temperature of the surface of roll 21 below that temperature which the film will become hot, stretched, distort or adhere to the roll 21.

A film heating roll 23 is disposed in bearing contact with the roll 21 and the film F is trained between the rolls 21 and 23 and over the latter which serves to very effectively heat the film to at least render the same semi-viscous or at least to the heat sealing temperature thereof. The heating roll 23 is of spiral shell construction and may be heated to a temperature which will permit heating of the film to its fusion temperature. To this end, when low density polyethylene is used as a film F, the surface temperature of the heating roll 23 may be as low as 235° F. although other density polyethylene films as well as other thermoplastic materials may require a much higher temperature to reach the heat sealing temperature thereof. The heating roll 23 is also provided with a surface which has release properties with respect to the hot thermoplastic film and in the embodiment shown, the spiral shell is covered with a Teflon film or a glossy, hard baked on silicone varnish which specifically has release properties to the hot untreated surface of the polyethylene, or hard chrome plated surface which is either polished or preferably etched or sand blasted to a matte finish.

It is again pointed out that the film F is maintained in unheated condition until the film is urged into contacting relation with the heating roll 23. When a polyolefin film such as polyethylene is used, the untreated surface of the film will be that surface which engages the heating roll 23, the treated or polar surface being disposed outwardly. With this particular arrangement, when the film F is heated the film will only lightly adhere to the surface of the heating roll. The adhesion of the semiviscous film with respect to the surface of the heating roll 23 is substantially less than the adhesive force between the film and substrate. This is attributable to the fact that the surface of the heating roll has release properties with respect to the polyolefin film or other types of film, and when polyethylene is used, the untreated side thereof is disposed adjacent the heating roll.

The heating roll 23 will be provided with suitable drive means to revolve the heating roll 23 so that this heating roll also serves as a conveying medium. The silicone rubber covered roll 21 as well as the cooling roll 22 are not driven by direct drive means but are driven indirectly by intercontacting relation with the heating roll 23. A laminating roll 24, provided with a suitable covering of silicone rubber or the like, cooperates with the heating roll 23 to form the laminating roll assembly. This laminating roll 24 is not directly driven but is revolved by its intercontacting relation with the heating roll and cooperates with the latter to urge the substrate S and heated film F to intimate contacting relation with repect to each other.

The laminating roll 24 may be shifted towards and away from the heating roll 23 by means of suitable air cylinders to close the nip area therebetween. To this end it has been found that the maximum pressure to be exerted on the substrate S and film F should be approximately 100 pounds per linear inch of nip. When the heated film is urged to intimate contact with the substrate S, the treated or polar surface of the film will form an interfacial surface of the laminate thus formed, and the adhesive force between the film F and the substrate S is substantially greater than the adhesive force between the film and the heating surface of the heating roll 23. Thus, as the film and substrate are laminated together, the film will be continuously stripped from the heating roll 23 even though the film is in semi-viscous condition.

The laminating roll 24, while provided with a heat resistant and resilient covering need not necessarily have release properties since only the substrate surface comes in contact with the laminating roll, except when the substrate web breaks, weaves, through accident or malfunction of equipment or operator's error. However, silicon rubber coverings are preferred.

The laminate is then trained over a pair of driven cooling drums or cylinders 25 which serve to cool the completed laminate L just prior to rewind thereof. The laminate L is thereafter trained over an idler type spreader roll 26 and is finally wound upon a rewind spool to form a roll 27 which is carried by a rewind stand 28. It is pointed out that if a polyolefin film has been used, the surface of the film which constitutes an exposed surface of the laminate L will be the untreated surface of the film. With this arrangement, there will be little if any tendency of the laminate to block or stick.

With respect to the treatment of the surface of polyolefin film, one surface of the film may be pretreated or suitable treatment apparatus may be incorporated in the present system. It treatment apparatus or mechanism is provided in the present system, this treatment mechanism may be positioned at any suitable location between the unwind stand for film F and the laminating roll assembly so that the film F may have one surface thereof continuously treated to render the same polar.

It is also pointed out that laminates which have been produced by the present process have many desirable characteristics and properties as compared to laminates formed by the extrusion coating process. In the extrusion coating process, a substrate is coated with a thermoplastic material which has been extruded upon the surface of the substrate. This process requires that the thermoplastic material be heated to an extremely high temperature in order to be extruded in a liquid condition. The heat of this system will result in oxidation of the surface of a polyolefin such as polyethylene, when this kind of polymer is used. Because of this surface oxidation of the film lamina, the film lamina will not heat seal to itself at uniform temperatures and the heat sealing temperatures are much higher than the heat sealing temperature of the laminates formed in accordance with the present process. It has been found that the heat sealing temperature of laminates formed by the extrusion coating process will vary from one roll of laminate to the other which is a condition which often disrupts the heat sealing operation in a packaging process wherein such extrusion coating laminates are used. Although the film in the instant process is heated to a semi-viscous condition, the temperature is substantially less than the extrusion temperature in the extrusion coating process so that undersirable odors associated with high temperatures are simply not present with the instant process although such undesirable odors are commonly associated with laminates formed by the extrusion coating process.

It has also been found that laminates formed by the present process do not have a tendency to curl which is another undesirable feature of the extrusion coating process. The curl of the laminate attendant with the extrusion coating process results not only from the difference in the co-efficient of expansion of the polymer and substrate, but another contributing factor is the extreme temperature differential between the substrate and the extruded polymer. In the extrusion coating process, the film is sometimes heated to a temperature of approximately 600 degrees F. while the temperature of the substrate is left unheated or is heated only slightly. The temperature differential plus the substantial difference in the co-efficient of expansions of the materials produces an undesirable curl during cooling of the laminate. However, the present process is heated to a temperature sufficient to cause the film to become semi-viscous and as the film is passed over the heating roll, an annealing effect takes place to relieve the structural stresses found in the film. In the event that a polyolefin such as polyethylene is used as the film, the film will be moved over the heating roll wherein the film is heated to at least a semi-viscous condition. The structural strains of the film will be relieved as the film is rendered more fluid and since the film is supported by its wide adherence to the heating roll, the strains will be substantially eliminated from the film prior to bonding of the same to the substrate and there will be little if any tendency of the film to shrink as a result of the occurrence of the memory phenomena. The strains in films such as polyolefin films are a result of both the manner in which the film is originally extruded as well as the molecular structure of the film itself. The undesirable curl characteristics of extrusion coating laminates is avoided in the present process.

It will be seen from the foregoing paragraphs that in the present process, the thermoplastic film itself is heated to a semi-viscous condition although this film is maintained in a dimensionally stable condition until just prior to the laminating step. The film is supported as it is heated to its heat sealing temperature to permit annealing effect to take place in the film to thereby avoid that amount of shrinkage which results in curling of the substrate. It will also be noted from the preceding description that in the present process, a thermoplastic film, preferably polyolefin such as polyethylene is bonded while in a semi-viscous condition to any of the commercially available substrate sheets such as paper, paperboard, foils or other thermoplastic film and the like. Although the substrate may be preheated in the present process, the primary heat to produce the heat sealing lamination is applied directly to the thermoplastic film just prior to the laminating step but in a manner which does not interfere with the dimensional stability of the film.

The tensioning means for the thermoplastic film shown or additional tensioning means may be used to cause sufficient stretching of the films so that printing thereon can be stretched to a desired size. Printing upon the film will be printed undersized or short and the film will be stretched a desired amount prior to being fed into the laminating roll assembly to bring the printing into proper size. This tensioning of the thermoplastic film for stretching or enlarging the printing thereon may be accomplished specifically in the same manner as that described in my copending application, Ser. No. 378,491, filed June 29, 1964, now U.S. Pat. No. 3,360,412.

Referring now to FIG. 2, it will be seen that a different apparatus system for carrying out the laminating process is thereshown. It is pointed out that the film may be selected from any of the commercially available thermoplastic materials although polyolefin film is again preferred, and specifically polyethylene is preferred. The film will have a treated surface which has been rendered polar by the corona discharge process or a gas flame oxidation process, such as that disclosed in my U.S. Pat. No. 3,360,417. The substrate may also be formed of any of the materials described with respect to the embodiment describing the apparatus system of FIG. 1. However, it is pointed out that in the embodiment of FIG. 2, preheating of the substrate above room temperature is not necessary for success in this operation.

The thermoplastic film will also be maintained in an unheated condition so that the film is at room temperature until applied to the heating medium. The heating medium of the system disclosed in FIG. 2 also comprises a revolvable heating drum which constitutes part of the pressure applying medium and serves as a nip roll.

The substrate 51 is unwound from a roll 50 of substrate which is suitably mounted upon an unwind stand 52. Again it is pointed out that the unwind stand will be provided with a suitable adjustable constant tension device although no such device is shown in the drawing. The thermoplastic film 53 is unwound from a roll 54 which is mounted upon a shaft 55 carried by an unwind stand 56. It is pointed out that a turret unwind stand 19 may be provided so that a reserve roll of thermoplastic material may be available to permit a flying splice to be made in the manner of the system disclosed with respect to FIG. 1. Further, a delicate constant unwind tension brake or device is also provided to avoid subjecting the film to excessive tension conditions and thereby avoid stretching, wrinkling, shrinkage in the width dimension. The apparatus system will also be provided with a suitable film web alignment means, such as the edge guide equipment referred with respect to the system of FIG. 1.

The film 53 is provided with an untreated surface 56 and a treated surface 57, the latter being treated by either a gas flame oxidation process or a corona discharge process which is disclosed in my U.S. patent, No. 3,360,417. Both of these methods are well-known in the art for activating a surface of polyolefin film.

The substrate 51 is passed over a rubber covered roller 58 which is supported upon arms 59 of a support 60. The support 60 also includes a stand 61 which supports a driven heated drum 62. The drum 62 is heated either with a steam or other heated fluids so that the surface temperature thereof is within the range of 230° F. to 300° F. The drum is constructed of metal and the metal surface thereof is coated with a release coating such as Teflon, silicon varnish, or other similar release material. The drum 62 cooperates with the roll 58 to exert a nip pressure of approximately 70 to 500 pounds per linear inch of nip.

It will be noted that the substrate and the film pass through the nip defined by the drums 62 and the roll 58 so that the film is positioned directly in contact with the drum while the substrate is positioned exteriorly thereof. The untreated surface 56 of the film 53 contacts the surface of the drum while the treated surface 57 is positioned in interfacial contact with the substrate 51. The film and substrate are held in this position with respect to the drum 62 and thereafer pass through the nip defined by the drum 62 and a rubber covered roll 63 which is mounted on support arms 64 of the support 60. The nip pressure exerted by the roll 63 and the drum 62 is also within the range of 70 to 500 pounds per linear inch of nip. The film and substrate are laminated together to form the laminate 65 as the substrate and film pass through the nip defined by the heated drum 62 and the roll 63. Although in the embodiment of FIG. 2, the film is held against the drum 62 through an arc of 180°, the arc or wrap may be within the range of 10° to approximately 360° if desired. The amount of surface of the drum 62 against which the film is held will be dependent upon the speed the film and substrate is moving.

In the embodiment of the system used in FIG. 2, it will be noted that although the film is heated to its fusion temperature by direct contact with the heated drum 62, the film is actually supported between the drum and the substrate, thus making possible the lamination of as small as one-half mil. When one-half mil film is being laminated to the substrate, it is thought that the heating of the film from room temperature, of approximately 70° F., to fusion temperature of 230° to 260° F. for low density in polyethylene, occurs almost instantly as the film and substrate pass between the nip defined by the roll 58 and the drum 62. Therefore at normal speeds and with one-half mil film, the principal lamination and transfer occurs almost instantly with additional adhesion occurring between the film and substrate at the nip defined by the drum 62 and the roll 63. However, with thicker films, such as two mil polyethylene film, then it is felt that the nip defined by roll 58 and drum 62 serves to position the film on the substrate while the principal laminating effect apparently taking place between the nip defined by the roll 63 and the drum 62. It is thought substantial transfer of the film to the substrate also occurs at the nip defined by roll 63 and the drum 62 with a thin film such as one mil film of polyethylene if the film is moved at web speeds of 1200 to 1500 feet per minute. Therefore, the apparatus system disclosed in FIG. 2 and the process practiced thereby not only permits lamination of relatively thin film to substrates but also permits lamination at speeds of 1200 and 1500 feet per minute.

It will also be noted that in the system of FIG. 2, not only is there no preheating of the substrate, but the film itself is maintained at ambient temperature until lamination thus permitting a very economic high capacity operation. The heat required to heat the materials (film) is merely that of the fusion temperature of the film which is approximately 230 to 260° F. for low density polyethylene.

As pointed out above, it is absolutely essential to treat one surface of the polyolefin, preferably with a corona discharge process. When one surface of the polyethylene is treated with a corona discharge process, apparently there is an increase in the active surface groups which permits a permanent bonding of the polyethylene to the substrate. While eliminating preheating of the substrate, not only is the process for the system illustrated in FIG. 2 rendered more economical but many more substrates are made available since some substrates are extremely sensitive to higher temperatures. Lamination between the substrate and film is essentially chemical so that a bond is permanent.

The laminated product 65 produced by the system of FIG. 2 also has little if any tendency to curl as compared to the extrusion coated product which are subject to curl. Apparently, since the film is positioned against the surface of the heated drum 62 for support thereon throughout an arc of approximately 180°. there is sufficient dwell time to produce the annealing effect on the film. This apparently is desirable where the film is formed by blown process.

Further, the laminated product 65 formed by the process and system disclosed in FIG. 2 has a capability of permitting ready sealing of the film to itself more readily than extrusion coated material due to the virgin or unchanged surface 56 of the film. In extrusion coated materials, the surfaces of the polyolefin become oxidized because of the high temperatures used in the extrusion process.

Further, the present process may be described as a dry lamination process since there are no solvents, adhesives or the like used in laminating the substrate to the film. In this regard, it is pointed out that the present process and system produces a product which is superior to the extrusion coated products since laminate 65 has an extremely tough coating of film material. It will be appreciated that films used in the present process generally fall within the melt index range of one, two and three, while extrusion coating resins are generally within a melt index of four, eight, ten and in some cases even fifteen. It will be appreciated that the lower the melt index, the higher the molecular weight and therefore the tougher the coating.

It is further submitted that with the dry lamination process, the gauge profile of the laminate may be more accurately controlled. The extrusion coated laminates are often poor gauged, poor mill roll formation simply because of the characteristics of the process itself. On the other hand, the present dry lamination process permits a product to be made from blown film which has an excellent mill roll formation as well as having a much better gauge than that of extrusion coated.

Thus it will be seen that I have provided a novel and unique process for producing a laminate from a substrate sheet and a thermoplastic film which laminate has many superior qualities to commercially available laminates formed by known techniques.

It will, of course, be understood that various changes may be made in the form, details, arrangement and pro-

What I claim is:

1. A continuous process for producing a heat sealed lamination from a film of polyolefin material having polar and non-polar surfaces and a substrate formed of a material dissimilar to thermoplastic film, the polar surface of the film having been rendered polar by subjecting the same to a corona discharge, said process comprising, moving the polyolefin film and the substrate sheet each through predetermined path of travel, and in doing so passing said film and substrate through a first pressure zone defined by first pressure applying medium and a revolving convex heating medium, said film being interposed between the substrate and heating medium so that the non-polar surface of the film is positioned against the heating medium, continuing movement of the film and substrate against the heating medium through a predetermined arc of travel to thereby rapidly cause the film to be heated from ambient temperature to a semi-viscous condition, the heating medium having release characteristics with respect to the non-polar surface of the film, passing said film and substrate through a second pressure applying zone defined by a second pressure applying medium and the heating medium so that the polar surface of the film intimately contacts the surface of the substrate sheet to effect heat sealing of the interfacial surfaces thereof, and the production of a permanent chemical bond thereat, the adhesive force between the film and substrate being substantially greater than the adhesive force between the non-polar surface of the film and the heating medium so that the film is stripped from the heating medium when the film is bonded to the substrate sheet, and continuing movement of a laminated film and substrate sheet.

2. The process as defined in claim 1 wherein said film and substrate film when moved between said first and second pressure applying zones and against the revolving convex heating medium is moved through an arcuate path of travel through an arc of 10° to approximately 360°.

3. The process as defined in claim 2 wherein said arcuate path of movement of the film and substrate between said first and second pressure applying zones is through an arc of at least 180°.

4. A process as defined in claim 1 wherein the film is formed of polyethylene film, and wherein the film and substrate are maintained at room temperature until passage thereof through the first pressure applying zone.

5. The process as defined in claim 4 wherein the first and second pressure applying zones each exert a nip pressure within the range of 70 to 500 pounds per linear inch nip.

6. A process as defined in claim 1 wherein the polyolefin film is heated by the heating medium to a temperature not greater than 280° F.

References Cited
UNITED STATES PATENTS

| | | | |
|---|---|---|---|
| 3,081,212 | 3/1963 | Taylor et al. | 156—164 |
| 3,081,214 | 3/1963 | Strome | 156—272 |
| 3,144,430 | 8/1964 | Schaffhausen | 260—45.5 |
| 3,329,549 | 7/1967 | Vilutis | 156—272 |
| 3,340,091 | 9/1967 | Zweig | 161—252 X |
| 3,405,020 | 10/1968 | Chavannes | 156—306 |

JOHN T. GOULKASIAN, Primary Examiner

J. C. GIL, Assistant Examiner

U.S. Cl. X.R.

156—290, 312, 499